(12) United States Patent
Oyaizu

(10) Patent No.: US 6,949,589 B2
(45) Date of Patent: Sep. 27, 2005

(54) ELASTIC FOAMED GRINDER MATERIAL AND METHOD FOR PRODUCING THE SAME

(76) Inventor: Yoshijiro Oyaizu, 955-1, Gokahorinouchi, Yaizu-shi, Shizuoka (JP)

( * ) Notice: Subject to any disclaimer, the term of this patent is extended or adjusted under 35 U.S.C. 154(b) by 245 days.

(21) Appl. No.: 10/096,245

(22) Filed: Mar. 13, 2002

(65) Prior Publication Data

US 2003/0066245 A1 Apr. 10, 2003

(30) Foreign Application Priority Data

Mar. 13, 2001 (JP) ........................................ 2001-071284

(51) Int. Cl.$^7$ .............................................. C08G 18/32
(52) U.S. Cl. ...................... 521/163; 521/128; 521/167; 521/170
(58) Field of Search ................................ 521/128, 163, 521/167, 170

(56) References Cited

U.S. PATENT DOCUMENTS

| | | | |
|---|---|---|---|
| 5,034,417 A | * | 7/1991 | Matsuo et al. .............. 514/605 |
| 5,616,677 A | * | 4/1997 | Primeaux et al. .............. 528/66 |
| 6,020,392 A | * | 2/2000 | Kushner et al. ............ 521/163 |
| 6,114,488 A | | 9/2000 | Kulp et al. |

FOREIGN PATENT DOCUMENTS

| | | |
|---|---|---|
| JP | 53-107794 | 9/1978 |
| JP | 4-115875 A | 4/1992 |
| JP | 11-291175 | 10/1999 |

* cited by examiner

*Primary Examiner*—John M. Cooney, Jr.
(74) *Attorney, Agent, or Firm*—Birch, Stewart, Kolasch & Birch, LLP

(57) ABSTRACT

An elastic foamed grinder material of polyurea series for grinding and/or buffing, which is obtainable by subjecting a composition including a main ingredient component including a polyisocyanate, and a composition comprising an aromatic diamine, a foaming agent, a foam-adjusting agent and a curing catalyst to foaming and curing in the presence of grinder granules, wherein the aromatic diamine is an aromatic diamine oligomer alone or in mixture with an aromatic diamine compound, and a method for producing the grinder material.

12 Claims, 1 Drawing Sheet

ELASTIC FOAMED GRINDER MATERIAL AND METHOD FOR PRODUCING THE SAME

FIELD OF THE INVENTION

The present invention relates to a grinder material for grinding metals, stainless steels, titanium alloys, glassware, minerals, stones, ceramics, plastics and the like, and for a precision grinding work and a buffing work (referred to hereinafter as buffing) of substrates for hard disks in computers, printed substrates or laminated substrates, lenses, the surface of parts of precision machines, edges of optical fibers, the surface of coated sheet metals and the like. More preferably, the present invention relates to a grinder material preferable for the use of finish grinding as well as a method for producing the same.

BACKGROUND OF THE INVENTION

In general, a grinder is produced by mixing and stirring a phenol resin, an epoxy resin, a polyester resin, a rubbery resin such as NBR or chloroprene, a polyvinyl alcohol resin, or the like as a binder, with a grinder granules and, if necessary, a filler, a foaming agent, a thickener, a coloring pigment, and the like, and then subjecting the mixture to molding and curing.

The structure of a grinder is composed of three elements: grinder granules, a binding material (a bonding agent), and vesicles (air voids). The performance and utility of a grinder are determined according to a combination of these three elements.

In case of rough (coarse) grinding (whetting), it becomes possible to make a grinder with moderate vesicles by binding grinder granules which have large granule sizes with a phenol resin, an epoxy resin, a polyester resin or the like having a strong binding power, thereby fixing them, and the resulting grinder is now widely utilized.

In case of precision grinding and buffing effect smaller in coarseness on surface, i.e. in case of the so-called finish grinding, however, it is a current status that a satisfactory grinder has not yet been offered.

In other words, a grinder is offered, which is produced by binding grinder granules which have small granule sizes with a phenol resin, an epoxy resin, a polyester resin or the like having a strong bonding power, thereby fixing them wherein vesicles are included. However, the binder of this grinder is a glass-like substance devoid of rubbery elasticity and is seriously brittle even processed to a foam body including air voids so that it easily disintegrates in the course of grinding, thus losing the function as grinder. In these systems, therefore, the granules to be used are divided more finely to make distribution of granularity narrower, allowed to disperse into the binder to form a dispersion which is then coated on paper, cloth or non-woven fabric and cured to offer a grinder.

When these grinders are used for precision grinding and buffing, however, a binder as a base material is too rigid (glass-like material) so that the diameter of the grinder granules inevitably influences directly coarseness of the surface of a material to be processed. Thus, it is difficult to conduct smooth, less concavo-convex even grinding. In these grinder series, therefore, a number of grinder granules having various diameters are prepared, and these grinders are used successively, from a coarse granule size to a fine granule size, to attain grinding, thus necessitating a long treatment time. Further, since a grinder is generally clogged up on use with ground dusts, the surface of the grinder deteriorated in grinding power caused by clogging is worked up (dressing) by whetting itself with a coarse grinder to renew the grinding surface. In case of a grinder obtained by comminuting the above grinder granules to be used finer, to make the granule distribution narrower, dispersing the granules into a binder such as a phenol resin, an epoxy resin, a polyester resin, coating the dispersion onto paper, cloth or non-woven fabric, and curing the coating, however, there is a drawback such that a dressing work cannot be made for the grinder clogged with ground dusts, thus incurring economical disadvantage. In other words, in case of a grinder coated on paper or cloth, a layer of the grinder granules is thin. If dressing is carried out for such a grinder, all of the grinder granules coated is detached to lose the function as a grinder. In case a grinder coated on non-woven fabric is subjected to a dressing work, the non-woven fabric is disintegrated into fibers so that the surface is not kept even to lose the function as a grinder.

On one hand, a grinder is proposed, which is prepared by fixing grinder granules which have small granule sizes with a rubbery binder such as chloroprene, neoprene and foaming the fixed material.

When a rubbery binder is foamed, however, it is softened (losing hardness) excessively so that swell is formed on the grinding surface (forming an irregular pattern) or grinding power is extremely weakened. Thus, the grinding work needs a considerable period of time.

In addition, weakness in fixing power of the grinder granules induces a number of defects such that the degree of consumption of grinder is significant.

A grinder series in which grinder granules are fixed with a polyvinyl alcohol resin is proposed. However, this series is weak in strength of the resin so that the degree of fixing the grinder granules is small. Moreover, the grinder of this series is weak in grinding power because it has a great hygroscopicity, and its effect tends to get influence of humidity and grinding property is unstable so that a number of defects arise, such as a long time being needed for grinding.

On the other hand, a foamed body containing a polyurethane resin as a binder (base material) is proposed to overcome these defects. The foamed body firmly fixes grinder granules and may contain air voids optionally so that it has been expected to be suitable for precision grinding. When the polyurethane resin is improved in hardness and strength and a foamed body is produced from the resin, however, this foamed body becomes brittle to lose the function as a grinder. On one hand, a foamed body containing a urethane rubbery elastomer as a base material is too soft so that drawbacks are found in that swell is formed or the foamed body lacks grinding property. Further, the urethane resin has a low softening point (140–150° C.). When the resin is applied to dry grinding use, fusion of a binder occurs due to grinding heat, thus showing a defect such that the grinding surface is stained and rapid deterioration of grinding power occurs. At present, therefore, the urethane resin is partially put into practice, limiting the use only for a wet grinding method.

Therefore, as a method of improving this heat resistance, a process wherein an urethane resin into which carbodiimido groups have been introduced (JP-A-53-107794 ("JP-A" means unexamined published Japanese patent application)) or an urethane resin into which isocyanurate groups and oxadoline structure have been introduced is used as a binder, and the like are proposed. Since these resins are such that a part of the urethane bonds in the urethane resins is replaced by these heat resisting bonds, but, the urethane resins as a whole are not regarded as modified so that the resins are still not beyond acquiring physical properties such as heat-resistance tolerating the dry grinding method. If these heat-resisting bonds are enhanced, this urethane resin will no longer possess rubbery elasticity and become extremely brittle, thus failing to obtain an elastic material possessing the desired toughness.

On the other hand, a process wherein a grinder material is obtained by using a polyurea resin as a binder, mixing the materials while air is caught up in the materials on stirring, heating the mixture and molding it under pressure (JP-A-11-291175) is proposed.

However, this grinder material is extremely small in the content of air (air voids) and the polyurea resin is an extremely hard material devoid of bending property and elasticity so that the grinder granules directly influences the surface to be ground. Thus, coarse grinding is possible with this grinder, but precision grinding or a polishing by buffing that a soft touch of a grinder onto the surface to be ground enables for the first time, cannot be attained.

At present, therefore, a process having been used heretofore, wherein solid grinder granules are dispersed into kerosene, a grinding oil or the like, and the dispersion is coated onto the surface to be ground, and then a non-woven fabric is rotated or reciprocally moved on the above-surface, is chiefly used as a practical method for precision grinding or buffering effect.

According to this process, the grinder granules are not fixed, as a matter of course, and grinding is extremely low in grinding power and necessitates a very long treating time. It is, however, a current status that this process is still reluctantly used.

In other words, needed for precision grinding and buffing effect (polishing) is a grinder having such nature as strong toughness tolerant to a severe dynamic action like grinding and rubbery elasticity in addition to heat resistance (high softening point) tolerant to grinding heat (including frictional heat) generated from the surface to be ground in the course of the dry grinding not only the wet grinding (a method for grinding while cooling with water), wherein a binder having a bonding power capable of strongly fixing grinder granules inherently having a small particle diameter is used, and air voids are optionally included to mitigate the directly-influence of the grinder granules on the surface to be ground, i.e. to enable mild contact of the grinder granules with the surface to be ground, thereby making it possible to grind articles evenly with less concavo-convex figure. In the current status, however, a grinder satisfying these requirements has not yet been proposed.

SUMMARY OF THE INVENTION

It is an object of the present invention to provide a grinder useful for precision grinding and buffing effect, i.e. an elastic foamed grinder material possessing rigidity, strong toughness, moderate rubbery elasticity, wear resistance, heat resistance, excellent precision grinding property hardly susceptible to magnitude in granule diameter of the grinder granules and difference in distribution of granular size, and buffing effect, i.e. excellent finish grinding property, wherein the grinder granules are strongly fixed, as well as it is another object of the present invention to provide a method for producing the same.

Other and further objects, features and advantages of the present invention will appear more fully from the following description, taken in connection with the accompanying drawings.

DETAILED DESCRIPTION OF THE INVENTION

Figure 1:
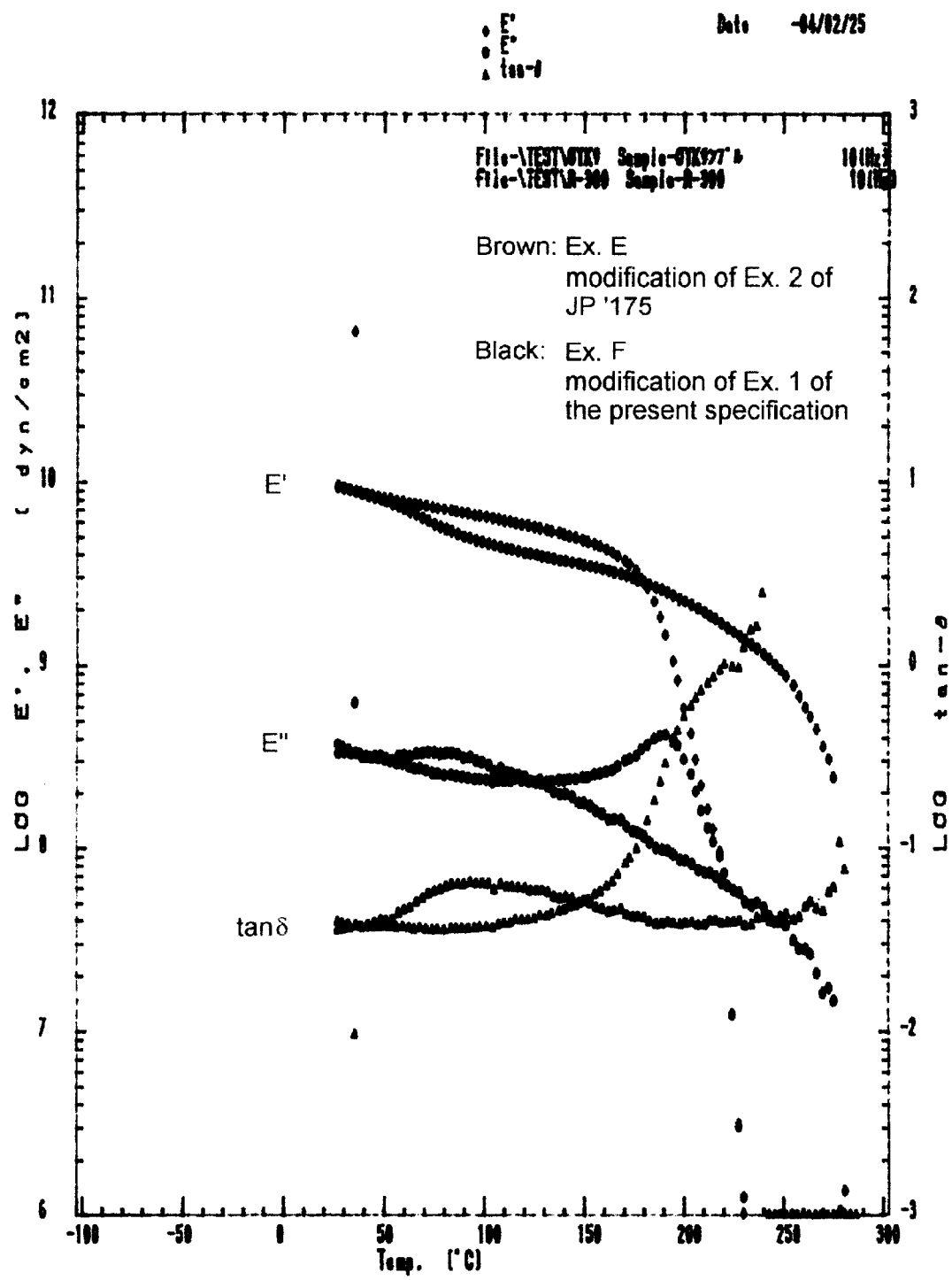
FIG. 1 is a microscopic photograph showing a sectional surface of the grinder material obtained in Example 9 according to the present invention, wherein circular black void portions are air voids and the other portion is the cured material but a number of small white spots in the cured material are fine particles of the grinder.
Figure 1:
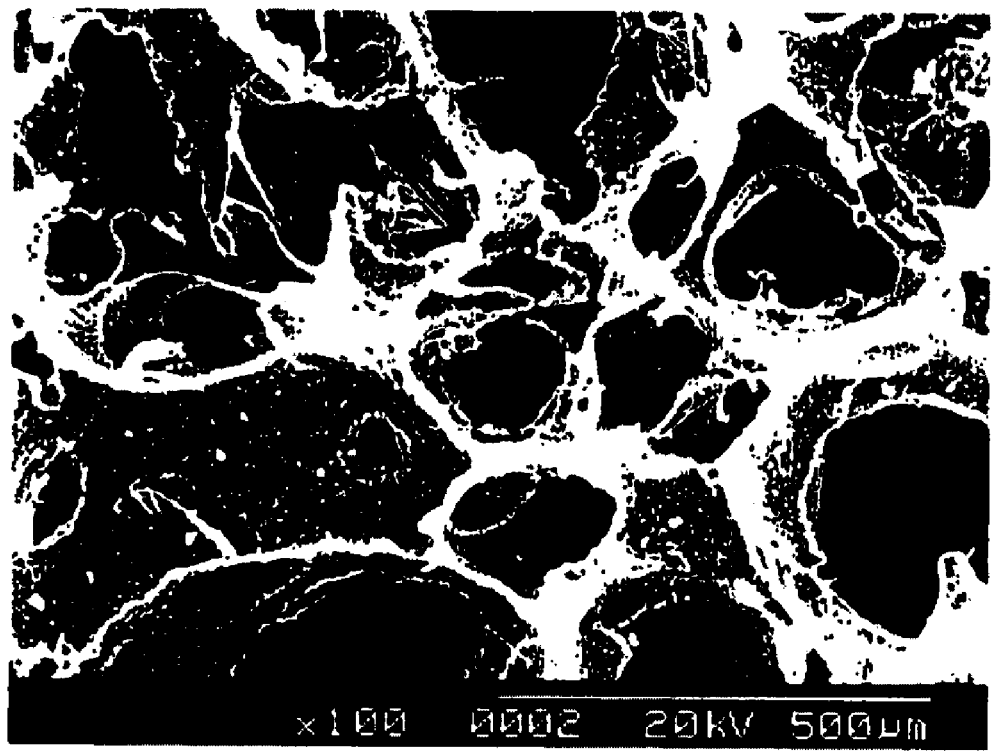

As a result of an extensive research in such aspect, the present inventor has found that the aforesaid problems can be overcome by using a main ingredient component comprising a polyisocyanate and a curing agent component containing a specific aromatic diamine mixture, in a grinder containing a polyurea resin as a binder, and has accomplished the present invention.

In accordance with the present invention, there are provided the following inventions.

(1) An elastic foamed grinder material of a polyurea series for grinding and/or buffing, prepared by subjecting a composition comprising a main ingredient component including a polyisocyanate, an aromatic diamine, a foaming agent, a foam-adjusting agent and a curing catalyst to foaming and curing in the presence of grinder granules, wherein the aromatic diamine is an aromatic diamine oligomer alone or in mixture with an aromatic diamine compound.

(2) The grinder material according to the item (1), wherein said aromatic diamine oligomer is a diamine oligomer of formula (1):

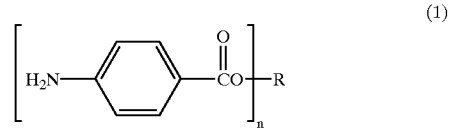

(1)

wherein R represents for a residue of an n-valent polyalkylene polyol, polyalkylene ether polyol or polyalkylene ester polyol each having an average molecular weight of 200 or more; and n represents 2 or 3, and an unsaturated bond or bonds may be contained in the polyalkylene moiety.

(3) The grinder material according to the item (1) or (2), wherein the aromatic diamine compound is at least one aromatic diamine compound selected from the group consisting of 4,4'-methylene-bis(2-chloroaniline), 4,4'-methylene-bis(2,3-dichloroaniline), 4,4'-methylene-bis(2,5-dichloroaniline), 4,4'-methylene-bis(3-chloro-2,5-diethylaniline), trimethyleneglycol-bis(4-aminobenzoate), 4-chloro-3,5-diamino-benzoic acid isobutyl ester, 3,5-dimethylthio-2,4-toluenediamine, 3,5-dimethylthio-2,6-toluenediamine, 4,4'-methylene-bis-(methylanthranilate), and 1,2-bis(2-aminophenylthio)ethane.

(4) The grinder material according to any of the items (1) to (3), wherein a ratio of the content of the aromatic diamine compound in the aromatic diamine is 50% by mass or less.

(5) The grinder material according to any of the items (1) to (4), wherein a foaming magnification of a polyurea elastomer caused by the foaming agent is 1.2 to 35 times, and a density of the grinder material is within the range from 0.03 to 1.2.

(6) The grinder material according to any of the items (1) to (5), wherein said grinder granules are contained in an amount of 70% by mass or less in a resin component which is a remainder of excluding the curing catalyst and a foaming agent component comprising the foaming agent and the foam-adjusting agent from a total of the main ingredient component of polyisocyanate and a curing agent component.

(7) The grinder material according to any of the items (1) to (6), wherein the grinder granules are fine particles.

(8) The grinder material according to any of the items (1) to (7), which is used for precision grinding and/or buffing.

(9) A method for producing an elastic foamed grinder material of a polyurea series for precision grinding and/or buffing according to any of the items (1) to (8), which comprise: mixing the aromatic diamine, the foaming agent, the foam-adjusting agent and the curing catalyst, further adding the grinder granules to the resultant mixture, followed by mixing and dispersing to prepare a curing component, mixing the curing component with a main ingredient component comprising a polyisocyanate at room temperature, and subjecting the resulting mixture to heating for reaction.

(10) An elastic grinder material, wherein grinder granules are fixed with a polyurea resin, and foamed.

For the polyisocyanate used in the present invention as the main ingredient component can be used the publicly known compounds. Toluene diisocyanate (TDI), diphenylmethane diisocyanate (MDI), MDI polymers, polyphenylene polyisocyanate (crude MDI), carbodiimide-modified MDI, carbodiimide-modified MDI polymers, cyclohexane diisocyanate (CHDI), isophorone diisocyanate (IPDI), naphthalene diisocyanate (NDI), 3,3'-dimethyl-4,4'-diphenylene diisocyanate (TODI), phenylene diisocyanate, p-phenylene diisocyanate(PPDI), and their mixtures; hexamethylene diisocyanate dimer (uretidione bonded compound), trimer (isocyanurate bonded compound), or a mixture thereof can be used singly or in combination. A prepolymer obtained by reacting a part of the polyisocyanate with a polyether, a polyester, or polybutadiene-polyol can also be used.

Among the aromatic diamines as the curing agent component of the present invention, the aromatic diamine oligomer of formula (1) is generally synthesized according to a process wherein a polyol is reacted with p-nitrobenzoic chloride and reducing the nitro group, or by reacting a polyol with an aminobenzoic acid alkyl ester.

Examples of the polyol that can be used in the above-reaction include polyether polyols, such as polytetramethylene ether glycol, polypropylene ether glycol and glycols of a copolymer of propylene oxide and ethylene oxide; further polyester polyols, such as polyethylene adipate polyol, polybutylene adipate polyol, polyester polyols of lactone series derived from ε-caprolactone or γ-butyrolactone, and polyols of adipate series obtained by the reaction of 3-methylpentanediol with adipic acid; and additionally polyalkylene polyols such as polyols of polybutadiene series.

The terminal groups of this aromatic diamine oligomer are generally amino groups, but contain hydroxy group(s) as the case may be. Alternatively, a part of both terminal groups may remain as hydroxy groups and can be used. A part of the main chains may optionally contain amido group.

This aromatic diamine oligomer is available as commercial products. Examples of the aromatic diamine oligomer starting from, for example, polytetramethylene ether glycol (PTMEG) as a polyol include Barsaring P-250 (molecular weight of the polyol: 250), Barsaring P-650 (molecular weight of the polyol: 650), and Barsaring P-11000 (molecular weight of the polyol: 1000), each marketed from Air Products and Chemicals, Inc.; and Elasmer-1000 (trade name, molecular weight of the polyol: 1000) and Porea SL-100A obtained by modifying the Elasmer-1000 to have a lower melting point (trade name, molecular weight of the polyol: 1000) each marketed from Ihara Chemical Ind., Co., Ltd. In addition to these, examples of the aromatic diamine oligomer starting from polyester polyol as a polyol include Elasmer-1000ES (trade name, molecular weight of the polyol: 1000) and Elasmer-1000SL obtained by modifing Elasmer-1000ES to have a lower melting point (trade name, molecular weight of the polyol: 1000) each marketed from Ihara Chemical Ind. Co., Ltd. These aromatic diamine oligomer can be used singly or in combination two or more.

In the aromatic diamine used for the curing agent component in the present invention, examples of the aromatic diamine compound which can be used in mixture with the above-mentioned aromatic diamine oligomer include:

4,4'-methylene-bis(2-chloroaniline),
4,4'-methylene-bis(2,3-dichloroaniline),
4,4'-methylene-bis(2,5-dichloroaniline),
4,4'-methylene-bis(3-chloro-2,5-diethyleneaniline),
4,4'-methylene-bis(methylanthranilate),
trimethylene glycol-bis(4-aminobenzoate),
4-chloro-3,5-diaminobenzoic acid isobutyl ester,
3,5-dimethylthio-2,4-toluenediamine,
3,5-dimethylthio-2,6-toluenediamine, and
1,2-bis(2-aminophenylthio)ethane.

These can be used as one or in mixture of two or more.

Further, these aromatic diamine compounds may be used in an amount of 50% by mass or less, preferably 5–50% by mass in the aromatic diamine. The grinder material obtained by foaming followed by curing can be enhanced in heat resistance by conjoint use of the aromatic diamine compound. By using the aromatic diamine compound jointly, the grinding effect can be exhibited without damaging elasticity of the core of the foamed body when the foaming magnification is enhanced. In addition, a definite grinding and buffing effects can be achieved without permitting strain of the foam greater. Moreover, any shrinkage of molded articles after molding can be prevented to enable the stable production. If the amount of the aromatic diamine compound is excessive, its use time will seriously be short to deteriorate productivity.

In the present invention, a molar ratio of isocyanate groups in the isocyanate as the main ingredient component to amino groups in the curing agent component containing the aromatic diamine ($NCO/NH_2$) is 0.8–1.5 and both components can be used within this range. If the molar ratio is less than 0.8, the cured grinder material (polyurea resin) will be depressed in softening point, thus not being preferable as incurring deterioration of heat resistance.

If the molar ratio exceeds 1.5, the resultant polyurea resin will deteriorate in rubbery elasticity to become rigid and brittle, thus not being preferable as elastic grinder material.

Accordingly, a more preferable molar ratio is within the range from 0.9 to 1.4.

Examples of the foaming agent of the present invention include HCFC-141b ($CH_3Cl_2F$), HFC-245fa ($CF_3CH_2CHF_2$), HFC-134a ($CH_2FCF_3$), HFC-365mfc ($CF_3CH_2CF_2CH_3$), n-pentane, cyclopentane and water. These agents can be used alone or in combination of two or more. An amount for the use is properly 30% by mass or less in the curing agent component with the exception of the grinder granules. Further, the foaming magnification is 1.2 to 35 times, preferably 5 to 30 times, and more preferably 8 to 25 times.

A density of the grainer material obtained after foaming is within the range of 0.03 to 1.2, preferably 0.05 to 1.10.

If the density is less than 0.03, the contact pressure onto the surface to be ground is too weak so that the precision grinding power is dropped. If the density exceeds 1.2, soft touch of the grinder onto the surface to be ground, becomes difficult to make it hard to operate precision grinding so that grinding becomes coarse.

Foams of the foamed material formed in the present invention may usually be independent foams or continuous foams.

Further, examples of the foam-adjusting agent in the curing agent component which can be used include a foam-adjusting agent of a silicon type, such as SZ-1605, SZ-1923, SZ-1932, SZ-1680, L-5302 and L-5340 (trade name; each is made by Nippon Unicar Co., Ltd.); SF-2908, SH-190 and SH-192 (trade name; each is made by Dow Corning Toray Silicone Co., Ltd.); and TEGOSTAB-8433 and B-8465 (trade name; each is made by Goldschmidt AG).

No particular limitation exists in an amount for the use, but it is properly used in an amount within 6% by mass or less of the curing agent component with the exception of the grinder granules.

A foamed grinder obtained by using the foam-adjusting agent together with a part of an antifoaming agent to make cells (the resin portions constructing the foam) coarse is effective as a method for enhancing grinding property. As the antifoaming agent which can be used in this case, a generally utilizable one can be employed and no particular limitation exists in this respect. As a defoaming agent of a silicone type, however, Baysilon V (trade name, marketed by Bayer AG), P420 (trade name, marketed by Kusumoto Chemicals, Ltd.) comprising a vinyl polymer, or the like can be used.

Examples of the curing catalyst in the curing agent component include amine type-catalysts, salts of organic acids and organometallic catalysts. As examples of the above amine series catalysts are mentioned triethylenediamine and its solutions dissolved in glycols, such as DABCO-1027, DABCO1028 and DABCO-33LV (each is trade name; each is made by Sankyo Air Products Co., Ltd.), N,N,N',N'-tetramethyl-1,6-hexanediamine, N,N'-dimethylcyclohexylamine, and (N,N-dimethylaminoethyl) ether. As examples of the above-salts of organic acids are mentioned potassium acetate and potassium oxalate. Further, dibutyltin dilaurate, stannous octoate are mentioned as examples of the above-organometallic catalysts. However, the catalysts are not limited to these.

These catalysts can be used alone or in combination of two or more. It is appropriate to use the catalyst in an amount within 5% by mass of the curing agent component with the exception of the grinder granules.

Examples of the grinder granules in the grinder material of the present invention include grinder granules of alumina type such as white alundum (WA) and alundum (A); grinder granules of silicon carbide type such as green carborundum (GC) and carborundum (C); grinder granules comprising ultragrinder granules such as diamond and cubic system boron nitride (CBN); and grinder granules such as chromium oxide, tin oxide, cerium oxide, iron oxide and zirconium oxide. One or two or more of these grinder granules can be used.

No particular limitation exists in the granule size of the grinder granules as a variety of mesh sizes of the grinder granules can be used in accordance with the intended use of the grinder and the purpose of grinding. Usually, however, the granule size is 120 to 10000 mesh (according to Tyler's standard sieves). In case of coarse grinding, the mesh size is 120 to 220, while in case of finish grinding, the mesh size is 240 to 8000. In either of the cases, the diameter of the air voids in foamed cured body is within the range from 50 $\mu$m to 5 mm. The grinder granules are finer than these sizes and within the range of preferably from 1.2 to 57 $\mu$m, and more preferably from 3 to 35 $\mu$m.

The amount of the grinder granules used is usually 70% by mass or less, preferably 3 to 70% by mass and particularly preferably 20 to 70% by mass for a total amount of the main ingredient component and the curing agent component with the exception of the foaming agent, and can be used by selecting the concentration according to the intended use. If the amount used is too small, the grinding effect and buffing effect will be deteriorated. If the amount used is too much, it will not be preferred since the grinder, as a whole, will become rigid and brittle to deteriorate the regenerating effect of the grinding surface of the grinder thereby making it difficult to work finish grinding. In addition, it is not preferred in an aspect that a mixing viscosity at the time of production is raised to incur hetrogeneous mixing. In case a granular diameter of the grinder granules is great, a precipitation-preventing agent may be used. In contrast, if the granular diameter is very small, a viscosity-decreasing agent or the like may be added and used.

In addition to these, a fluorine resin powder or polyethylene powder can be added as a self-lubricant in an amount of 10% by mass or less to the curing agent component.

Further, rubber dust, cashew dust or the like as well as barium sulfate, graphite, antimony trisulfide, mica, zirconia, silica, alumina, calcium carbonate, magnesium carbonate or the like can be added as a friction-adjusting agent.

The grinder material of the present invention may further be incorporated with an inorganic filler, for example, pigments such as chromium oxide, titanium oxide, iron red, iron oxide, graphite or the like; calcium carbonate, cryolite, or calcium fluoride; a stabilizer of a hindered amine type, a hindered phenol type, benzothiazole series or the like; or additives such as a segregation-preventing agent, a dispersing agent, a sedimentation-preventing agent, a thickener or the like.

Fiber series material, for example, polyester fibers, polyamide fibers, or natural fibers such as wool, cotton, or the like may be incorporated alone or in combination of two or more. It is preferred that these material have usually a length of about 0.1 to 5 mm and a diameter of about 0.5 mm.

The grinder material of the present invention can be obtained by subjecting a mixture of the above-mentioned main ingredient component comprising the polyisocyanate, a component comprising the aromatic diamine, the foaming agent, the foam-adjusting agent and the curing agent, and the grinder granules to foaming and curing. Illustrating in more detail, the main ingredient component comprising the polyisocyanate and the curing agent component comprising the aromatic diamine, the foaming agent, the foam-adjusting agent, the catalyst and the grinder granules are mixed at room temperature of about 10 to 40° C. for several seconds, and the mixture is injected into a mold preheated at a temperature within the range of 30 to 80° C., cured at this temperature for 15 to 30 minutes and then taken out from the mold. The molded material is post-cured a temperature within the range of 80 to 170° C., and then allowed to cool to room temperature thereby obtaining the cured molded grinder material. The grinder material may also be manufactured by an automatic mixing and injection casting machine.

In order to use the grinder material of the present invention for actually as a grinder, the above-molded articles obtained by foaming and curing may be sliced into panels of 0.5 to 5 mm and the panels are provided onto one side surface thereof with a tape with adhesive on both sides or a magic tape and each panel is fixed onto a disk of an electric sander, grinder or the like and offered to precision grinding or buffering, i.e. finish grinding.

The elastic foamed grinder material of the present invention can be applied to a cylinder for grinding by molding with a cylinder mold or to a grinder with a shaft by molding with a shaft. The elastic foamed grinder sliced as a tape may be applied onto a cloth or the like with an adhesive or a tape with adhesive on both sides, or alternatively, the elastic foamed grinder may be applied to integral molding to form a belt-type grinder or if necessary, may be converted to an other suitable form, so that the elastic foamed grinder of the present invention is applicable to any kind of grinding method.

Further, desired grinder granules may be coated with a binder of a polyurea series, a binder of an epoxy series, or a binder of a rubber series onto one side of a sliced polyurea foamed body or elastic foamed grinder and the coated material can be applied as a grinder material.

Furthermore, solid grinder granules can be jointly used with a grinding oil or dispersed into kerosene, a grinding oil or the like, and the dispersion can be used jointly.

The above-obtained polyurea elastic foamed grinder material can be used for not only wet grinding but also dry grinding and preferably for precision grinding and buffing effect.

The polyurea elastic foamed grinder material of the present invention prepared by mixing the main ingredient component comprising a polyisocyanate with the curing agent component comprising at least two types of the specific aromatic diamine, the foaming agent, the foam-adjusting agent, the curing catalyst and grinder granules and subjecting the mixture to heating, reacting, foaming and curing, can be produced within a short period of time. The elastic foamed grinder material of the present invention is excellent in bending properties such as de Mattia property.

Further, the grinder formed by cutting the grinder material into a given shape is excellent in wear resistance and heat resistance and applicable to both wet grinding and dry grinding, and possesses excellent finish grinding performance especially in combination with both precision grinding effect and buffing effect.

The present invention will now be illustrated in more detail based on Examples, but the present invention is not meant to be limited by these examples.

EXAMPLES

With respect to the polyisocyanate main ingredient component and curing agent component comprising the aromatic diamine and others, the following compounds were used:

(1) Polyisocyanate Component:
    143L: Liquid MDI [made by Mitsubishi Chemical Corp.] NCO content: 29.0%
    PAPI-135: Crude MDI [made by Mitsubishi Chemical Corp.] NCO content: 31.0%.

(2) Curing Agent Component:
(Aromatic Diamine Oligomer)
    Elasmer-1000: poly(tetramethylene oxide)-di-p-aminobenzoate [Ihara Chemical Ind. Co., Ltd.] amine value: 92.6 KOH mg/g,
    Elasmer-1000ES: polyester-series di-p-aminobenzoate [Ihara Chemical Ind. Co., Ltd.] amine value: 95.0 KOH mg/g,
    PoreaES-100A: lower melting point-modified aromatic diamine oligomer of polyeter series [Ihara Chemical Ind. Co., Ltd.] amine value: 92.6 KOH mg/g, (Aromatic Diamine Compound)
    MOCA: 4,4'-methylene-bis(2-chloroaniline)[Ihara Chemical Ind. Co., Ltd.] amine value: 420 KOH mg/g,
    CUA-4: trimethylene glycol-bis(4-aminobenzoate) [Air Products and Chemicals Inc.] amine value: 357 KOH mg/g,
    TCDAM: 4,4'-methylene-bis(2,3-dichloroaniline) [Ihara Chemical Ind. Co., Ltd.] amine value: 334 KOH mg/g,
    Ethacure-300: a mixture of 3,5-dimethylthio-2,4-toluenediamine and 3,5-dimethylthio-2,6-toluenediamine (mixing ratio=8:2) [Ethyl Corp.] amine value 524 KOH mg/g, 1,4-BD: 1,4-butanediol [Wako Pure Chemical Industry, Ltd.]

DABCO-33LV: a triethylenediamine solution (catalyst) [Sankyo Air Products Co., Ltd.] contents: 33%, solvent: dipropylene glycol, DABCO K-15: potassium octoate (catalyst) [Sankyo Air Products Co., Ltd.], TOYOCAT-ET: N,N-dimethylaminoethyl ether (catalyst) [Tosoh Corporation], SZ-1932: a foam-adjusting agent of silicone series [Nippon Unicar Co., Ltd.], HCFC-141b: 1,1-dichloro-1-fluoroethane (foaming agent) [Central Glass Co., Ltd.] (referred to hereinafter simply as 141b), Grinder granules: green carborundum (GC) [Fujimi Incorporated], GC-400 (400 mesh), GC-600 (600 mesh), GC-1000 (1000 mesh), GC-3000 (300 mesh); and carborundum (C) [Fujimi Incorporated] C-8000 (8000 mesh).

Examples 1 to 3, and 5 to 6

(1) Proportions of the components in each example are shown in Table 1, and the molding condition, reactivity, physical properties, and grinding characteristics in each Example are shown in Table 2. The method for operation is given in the following.

(2) To Elasmer-1000 or Elasmer-1000ES as the aromatic diamine oligomer, the various aromatic diamine compounds shown in Table 1 were weighed and added and the mixture was heated at 100 to 130° C. to dissolve the aromatic diamine compound and the mixture was cooled to room temperature.

Next, the catalyst DABCO-33LV, DABCO K-15, the foam-adjusting agent SZ-1932 and the foaming agent 141b were successively weighed and well mixed. To the mixture, the grinder granules GC400 were weighed and added, and the whole was again mixed to prepare a curing agent component.

The main ingredient component containing 143L or PAPI-135 was weighed and admixed with the curing agent component quickly and homogeneously and then the mixture was preheated at 75° C. The mixture was then charged into a mold (inner diameter: 100 mmø, height: 200 mm) opened on the upper side thereof and maintained at the same temperature for 15 minutes for curing. The mixture was then taken out from the mold, post-cured in a temperature bath kept at 140 to 160° C. for 3 hours, and cooled to room temperature to obtain a grinder material.

(3) Concerning the reactivity, on the other hand, the above-mentioned curing agent component and the main ingredient component were mixed as a separate batch, charged into a box (100 mm×100 mm×200 mm) kept at a room temperature, and measured the time of (a) the liquid becoming emulsified (a cream time in terms of second) and the time of (b) a surface layer of the foaming body no longer being threaded (a gel time in terms of second).

(4) Physical properties of the resultant grinder material were measured according to the following methods:

① Density: Determined by measuring the volume and weight of the grinder material.

② Hardness: The surface layer of the grinder material was so cut as to become flat and measured by the aid of Ascar Hardness meter Type C.

③ Melting temperature: as a separate batch, the curing agent component excluding the foaming agent and the main ingredient component were mixed and molded under the conditions as shown in Table 2 to obtain non-foamed sheet molded articles. The molded articles were cut into a test piece having a thickness of 2 mm, a width of 5 mm and a length of 5 cm, which was subjected to a viscoelasticity spectrum measurement at a temperature-elevation velocity of 10° C./min. and a frequency of 10 Hz thereby determining a temperature at which a storage elastic modulus (E') within a higher temperature range was rapidly depressed, as melting temperature (° C.).

④ Bending test: The grinder material was sliced into a sheet having a thickness of 1.5 mm by the aid of a cutter, and the resultant grinding sheet was folded into two part (180°) thereby checking the sheet as to whether it was cracked or not. A sheet not cracked was evaluated as OK.

⑤ Foaming magnification: The densities of the molded articles prepared for the above-mentioned measurement of the molting temperature were divided by densities of a variety of the elastic foamed grinder materials thereby determining the obtained value as forming magnification.

⑥ Grinding properties: The grinder material was sliced into a grinding sheet of 1.5 mm in thickness. A tape with an adhesive on both sides was attached onto one side surface of this sheet, and the sheet was then mounted to an electric sander. The sheet was then pressed onto a surface to be ground of a square bar made of iron (1.6 mm in thickness, 60 mm×30 mm inside, and 0.91 m in length) rotating at 7000 rpm adjusted by the aid of a speed controller and the grinding work was operated for 20 minutes while maintaining the rotation at 5000 rpm.

The ground surface was thereafter observed in accordance with the following items:

Durability: abnormality such as any attached resin and the like on the ground portion was observed thereby evaluating no detection as good.

Stain by resin: In case the bound resin was molten by the heat of grinding, the resin was attached onto the ground surface.

Luster: Observation was made on the buffing effect.

⑦ Grinding range: Various kinds of sand paper (#400, #600, #1000 and #2000) were cut into pieces of 100 mmø, attached on the backside thereof to a tape with an adhesive on both sides, mounted to an electric sander, and used for grinding for about 3 minutes by pressing the paper against square bars made of iron each rotated at 5000 rpm. The ground surfaces obtained by the individual grinding sheets were ranked from 1 to 5 in the order of decreasing luster that means coarseness of the surface being increased. This ranking was compared with the grinding properties of the grinding sheet samples and shown by numerals:

| Sand paper | #400 | #600 | #1000 | #2000 | >#2000* |
|---|---|---|---|---|---|
| Evaluation rank | 1 | 2 | 3 | 4 | 5 |

*This shows that as compared with the case of #2000, coarseness of the surface is weak while luster is 5 excellent.

Example 4

Elasmer-1000 as the aromatic diamine oligomer and Ethacure-300 as the aromatic diamine compound were weighed, heated at 70° C., well mixed and allowed to cool down to room temperature. The subsequent treatments were carried out in the same manner as in Example 1, to obtain a grinder material. Performance of the grinder material was thereafter evaluated similarly.

Comparative Example 1

(1) 240 Grams of polyisocyanate 143L and 60 g of polytetramethylene ether glycol (an average molecular weight: 650, OH value of 172.6 KOH mg/g) were weighed and mixed, reacted together with stirring for 3 hours at 80° C. to obtain about 280 g of a prepolymer (NCO contents: 20.6%).

To 100 g of this prepolymer was added 30 g of a foaming agent 141b and 121 g of grinder granules GC-400 to form a main ingredient component.

(2) Next, 19.1 g of 1,4-BD (molecular weight: 90), 0.3 g of water, 0.6 g of TOYOCAT-ET, 0.1 g of DABCO-33LV, and 0.7 g of SZ-1932 were mixed to prepare a curing agent component.

(3) To this curing agent component was added the main ingredient component previously prepared. The mixture was quickly mixed homogeneously and subjected to a molding operation as in Example 1.

As the viscosity at the time of mixing was extremely low, however, a homogeneous dispersion of the grinder granules on stirring could not be made so that an urethane foamed body in which the grinder granules were homogeneously dispersed could not be obtained. Thus, manual stirring was continued until foaming initiated, and injected immediately into a box. However, the violently foamed body was violently shrunk to destroy, thus failing to obtain a foamed body. For this reason, obtaining of the molded articles was abandoned.

Examples 7 to 10

The grinder granules GC-400 in the curing agent component of Example 1 was replaced by a variety of grinder granules as shown in Table 3, and the treatment was carried out in the same manner as in Example 1 to obtain cured and molded grinder materials. Each performance of the grinder materials was evaluated in the same manner and the results were shown in the same table.

Examples 11 to 14

Excepting that the amount of the foaming agent 141b in the curing agent component of Example 1 or the amount of water was replaced by the amounts as shown in Table 4, the treatment was carried out in the same manner as in Example 1 to obtain cured grinder materials. Each performance of the grinder materials was evaluated in a similar manner and the results were shown in Table 4 together with those in Example 7.

As apparent from Table 2, the grinders (Examples 1 to 6) obtained from the various polyurea elastic foamed grinder materials of the present invention can be molded within a short period of time and according to a simple method and possess a high level of heat resistance and excellent precision grinding property and buffing effect. Above all, the grinder materials in Examples 1 to 5 using the aromatic diamine compounds jointly and higher in foaming magnification show excellent precision grinding property and buffing effect.

As is also manifest from Table 3, foamed body of a high elasticity was obtained even in case of the grinder granules of whatever granular diameter (Examples 7 to 10), so that the foamed body was softly contacted with the surface to be ground and showed a small degree in coarseness of the ground surface as compared with grinding property of a sand paper having the same granular diameter, thus making it more suitable to use the foamed body for precision grinding. Further, the fact that the grinding range was broad showed planning of shortage in the grinding step, i.e. significant shortage in the treating time.

Moreover, Table 4 obviously shows that the grinder manufactured from the grinder material of the present invention achieves the almost same grinding effect and buffing effect notwithstanding the foaming magnification varies significantly from 9 to 26 times. It is also shown that excellent precision grinding effect and buffing are obtained even if the content of the grinder granules is small.

Example 15

To the curing agent component shown in Table 5, i.e. 145.3 g of a homogeneously mixed solution of Elasmer-1000, MOCA, the catalyst, and the foam-adjusting agent was added 133 g of the grinder granules GC-400 and 18.5 g of the foaming agent 141b, and the mixture was homogeneously mixed. To this mixture was added 75.4 g of the isocyanate 143L and the mixture was quickly mixed homogeneously and poured into a wooden box mold of 150 mm×150 mm×200 mm having a polyethylene bag inside where the mixture was allowed to foam freely.

In this case, a time within which the mixed liquid poured into the wooden box became opaque (a time period from the initiation of mixing to becoming opaque) was determined as cream time. While the foaming is growing, a finger was contacted with the upper layer to check the time of the surface layer no longer being threaded (a time period from the initiation of mixing to the layer no longer being threaded) and the time was measured as gel time.

After the lapse of 15 minutes, molded articles were taken out from the box and post-cured for a given period of time at a given temperature. By the way, the amount of the grinder granules added corresponded to 60% by mass of the resin component.

Example 16

The curing agent component as shown in Table 5 was treated similarly as in Example 15 to prepare a mixed liquid comprising 180.1 g of the curing agent component and 133 g of the grinder granules GC-400. To this liquid was added 82.6 g of the isocyanate 143L and the mixture was quickly mixed homogeneously and then treated as in Example 15. By the way, the amount of the grinder granules added corresponded to 60% by mass of the resin component.

Comparative Example 2

400 Grams of a polyether polyol of sucrose series (OH value: 450 KOH mg/g), 40 g of a polyether polyol of tolylenediamine series (OH value: 400 KOH mg/g), 20 g of a polyether polyol of ethylenediamine series (OH value: 750 KOH mg/g), 2.6 g of water, 1.5 g of the foam-adjusting agent SZ-1919, 0.9 g of DABCO K-15, 1.2 g of TOYOCAT-MR, and 23 g of the foaming agent 141b were weighed respectively and mixed to prepare a curing agent component. To 129.2 g of this curing agent component was added 184 g of grinder granules GC-400 and the mixture was homogeneously mixed. 204 Grams of the isocyanate PAPI-135 was weighed, quickly mixed with the mixture homogeneously and poured into a box where the mixture was allowed to foam freely.

After 15 minutes, this was taken out from the mold and placed in a temperature bath maintained at 100° C. for 3 hours to effect post-curing thereby obtaining the molded articles. The subsequent treatments and tests for physical properties were carried out similarly as in Example 15. By the way, the amount of the grinder granules added corresponded to 60% by mass of the resin component.

Comparative Example 3

To 50 g of Elasmer-1000 as an aromatic diamine oligomer was weighed and mixed with 34.2 g of MOCA, and the mixture was heated at 110° C. to dissolve MOCA completely thereby forming a homogeneous solution. The solution was cooled to 80° C. and kept in a temperature bath. To this were weighed and mixed 134 g of GC-1000 previously heated at 80° C. and again kept in the temperature bath. 7.2 Grams of the foam-adjusting agent SZ-1932 and 51.9 g of 143L were weighed and stirred for 20 seconds while sending air into the mixture by way of dissolver blades.

However, the formation of gel was initiated on the way so that the mixture could not be poured into a mold.

Thus, 51.9 g of 143L was weighed and mixed with 225.4 g of the curing agent solution containing the foam-adjusting agent and the grinder granules prepared by the same operation as the above and set at 80° C. while using dissolver blades for 8 seconds to allow air voids to be involved in the mixture. The mixture was poured into a mold (for molded article of 100 mm×100 mm×3 mm) heated at 100° C. and cured for 15 minutes. The molded articles were thereafter taken out from the mold, post-cured for 3 hours at 160° C., and cooled to room temperature to obtain a grinder material.

The molded articles of Comparative Example 3 was a grinder material higher in density and hardness and devoid of flexibility which contained polyurea as binding agent and a small amount of air voids caused by inclusion of air. This grinder material is low in evaluation ranking of grinding properties and shows coarse grinding properties so that the material is not furnished with precision grinding property of the present invention.

With respect to de Mattia and grinding properties of the above-mentioned Examples 15 and 16 as well as Comparative Examples 2 and 3, the test and evaluation were carried out according to the following methods. The density and hardness were measured according to the above-mentioned methods.

(1) De Mattia test: This test was carried out in accordance with JIS K7312. A test piece was prepared by cutting out a flat panel of 25 mm in width, 150 mm in length, and 25 mm in thickness. The test piece devoid of any notch was measured for bending cycles at 23° C. and at a cycle of 300/mimutes with a moving distance of a cramp tool being 57 mm.

(2) Grinding properties: The resultant molded articles were sliced to have a thickness of 3 mm thereby preparing a grinding sheet. A tape with adhesive on both sides was attached to one side of the grinding sheet and mounted to an electric sander. Rotation of the sander was adjusted to 7000 rpm by way of a speed controller. A flat portion and an edge portion of an iron block (1.6 mm in thickness, 60 mm in length and 30 mm in side; edge R: 10ø and 0.91 m in length) were pressed against the sander so as to keep a rotation number of 5000 rpm and a grinding work was continued for 5 minutes.

After the work, the ground surface and the grinding sheet were observed according to the following items:

Grinding range: Same as the method described in (4)–⑦

Luster: Observed with respect to buffing effect

Disintegration: The flat portion and the edge portion of the iron block were ground with the grinding sheet and durability thereof was evaluated.

Practicability: The grinding sheet devoid of disintegration was recorded as Yes. The grinding sheet having disintegration was recovered as No.

In table 6, in comparison of Examples 15 and 16 with Comparative Example 2, it is understood that the grinding sheet in Examples 15 and 16 excellent in dynamic performance, i.e. de Mattia property are also excellent in grinding properties, buffing effect and durability, thus manifesting that the polyurea elastic hard foam furnished with toughness of the present invention is superior as grinding material.

TABLE 1

| | Examples | | | | | |
|---|---|---|---|---|---|---|
| Items | 1 | 2 | 3 | 4 | 5 | 6 |
| [Composition] | | | | | | |
| Elasmer-1000 | 100 | 100 | 100 | 100 | — | — |
| Porea SL-100A | — | — | — | — | — | 100 |
| Elasmer-1000ES | — | — | — | — | 100 | — |
| MOCA | 42.9 | — | — | — | 42.9 | — |
| CUA-4 | — | 50.4 | — | — | — | — |
| TCDAM | — | — | 54 | — | — | — |
| Ethacure-300 | — | — | — | 34.4 | — | — |
| DABCO-33LV | 1.4 | 1.4 | 1.4 | 1.4 | 1.4 | 0.7 |
| DABCO-K-15 | 0.9 | 0.9 | 0.9 | 0.9 | 0.9 | 0.6 |
| SZ-1932 | 2.0 | 2.0 | 2.0 | 2.0 | 2.0 | 1.5 |
| 141b | 42.9 | 42.9 | 42.9 | 42.9 | 42.9 | 25 |
| Grinder granule [GC-400] | 218.3 | 226.0 | 229.4 | 209.8 | 213.4 | 125.6 |
| 143L (NCO-content 29.0%) | 75.4 | 75.4 | 75.4 | 75.4 | — | 25.6 |
| PAPI-135 (NCO-content 31.0%) | — | — | — | — | 70.5 | — |

TABLE 2

|  | Examples | | | | | | Comparative |
|---|---|---|---|---|---|---|---|
| Items | 1 | 2 | 3 | 4 | 5 | 6 | example 1 |
| [Mold-conditions] | | | | | | | |
| Mixing [° C.] × [sec] | 1.07 | 1.07 | 1.07 | 1.07 | 1.07 | 1.07 | 1.07 |
| | 23 × 7 | 23 × 7 | 23 × 7 | 23 × 7 | 23 × 7 | 23 × 7 | 23 × 7 |
| Curing [° C.] × [min] | 75 × 15 | 75 × 15 | 75 × 15 | 75 × 15 | 75 × 15 | 75 × 15 | 75 × 15 |
| Post-curving [° C.] × [hrs] | 160 × 3 | 150 × 3 | 160 × 3 | 160 × 3 | 150 × 3 | 140 × 3 | — |
| Forming-magnification [times] | 15.0 | 14.0 | 13.0 | 17.0 | 13.0 | 6.0 | — |
| [Reactivitiy] | | | | | | | |
| Cream time [sec] | 25 | 38 | 33 | 24 | 21 | 60 | 35 |
| Gel time [sec] | 50 | 76 | 66 | 48 | 45 | 90 | 120 |
| [Physical properties] | | | | | | | |
| Density [g/cm$^3$] | 0.10 | 0.11 | 0.12 | 0.090 | 0.12 | 0.22 | —[1] |
| Hardness [ASKer C] | 50 | 55 | 60 | 46 | 58 | 45 | —[1] |
| Melting temperature [° C.] | 280 | 261 | 268 | 273 | 287 | 252 | 140 |
| Bending property [180° C.] | OK | OK | OK | OK | OK | OK | —[1] |
| [Grinding properties] | | | | | | | |
| Durability | Good | Good | Good | Good | Good | Good | —[1] |
| Fouling on ground surface | None | None | None | None | None | None | —[1] |
| Luster | Good | Good | Good | Good | Good | Slightly-defective | —[1] |

[1] It was impossible to measure because the molded article was not obtained.

TABLE 3

|  | Examples | | | | |
|---|---|---|---|---|---|
| Items | 1 | 7 | 8 | 9 | 10 |
| [Composition] | | | | | |
| Composition of foamed bodies | (Same as in Example 1) | | | | |
| Types of grinder granules[1] | GC | GC | GC | GC | C |
| Grain size [Mesh] | 400 | 600 | 1000 | 3000 | 8000 |
| Amounts to add [g] | 218.3 | 218.3 | 218.3 | 218.3 | 111.3 |
| [Reactivitiy] | | | | | |
| Cream time [sec] | 25 | 26 | 22 | 20 | 20 |
| Gel time [sec] | 50 | 50 | 48 | 43 | 45 |
| Foaming-magnification [times] | 15 | 17 | 15 | 18 | 16 |
| [Physical properties] | | | | | |
| Density [g/cm$^3$] | 0.07 | 0.09 | 0.10 | 0.07 | 0.07 |
| Hardness [ASKer C] | 37 | 46 | 50 | 35 | 36 |
| Bending property [180° C.] | OK | OK | OK | OK | OK |
| [Grinding properties] | | | | | |
| Fouling on ground surface | None | None | None | None | None |
| Range to be ground* | 4 or more | 4 or more | 4 or more | 5 or more | 5 or more |

[1] GC: Green carborundum   C: Carborundum

TABLE 4

|  | Examples | | | | |
|---|---|---|---|---|---|
| Items | 7 | 11 | 12 | 13 | 14 |
| [Composition] | | | | | |
| Elasmer-1000 | 100 | 100 | 100 | 100 | 100 |
| MOCA | 429 | 42.9 | 42.9 | 42.9 | 42.9 |
| DABCO-33LV | 1.4 | 1.4 | 1.4 | 1.0 | 0.14 |
| DABCO-K-15 | 0.9 | 0.9 | 0.9 | 0.8 | — |
| TOYOCAT-ET | — | — | — | — | 0.14 |
| UG-1932 | 2.0 | 2.0 | 2.0 | 2.0 | 1.00 |
| 141b | 28.5 | 36.0 | 50.0 | 42.0 | 14.0 |
| Water | — | — | — | 1.4 | 0.21 |
| Grinder granule | | | | | |
| [GC-400] | 218.3 | 218.3 | 218.3 | 218.3 | — |
| [GC-600] | — | — | — | — | 171.5 |

TABLE 4-continued

|  | Examples | | | | |
|---|---|---|---|---|---|
| Items | 7 | 11 | 12 | 13 | 14 |
| PAPI-135 | 72.8 | 86.2 | 86.2 | 66.3 | — |
| 143L | — | — | — | — | 179.0 |
| NCO index index | 1.10 | 1.30 | 1.30 | 1.00 | 1.07 |
| [Reactivity] | | | | | |
| Cream time [sec] | 20 | 22 | 24 | 30 | 32 |
| Gel time [sec] | 42 | 43 | 46 | 50 | 53 |
| Foaming-magnification [times] | 9 | 11 | 26 | 17 | 2.8 |
| [Physical properties] | | | | | |
| Density [g/cm$^3$] | 0.16 | 0.13 | 0.05 | 0.08 | 0.49 |
| Hardness [ASKerC] | 77 | 63 | 31 | 42 | 95 |
| Bending property [180° C.] | OK | OK | OK | OK | OK |
| [Grinding properties] | | | | | |
| Fouling on ground surface | None | None | None | None | None |
| Range to be ground | 4 or more | 5 or more | 5 or more | 5 or more | 4 or more |

TABLE 5

|  | Examples | |
|---|---|---|
| Items | 15 | 16 |
| [Composition] Parts | | |
| Elasmer-1000 | 100 | 100 |
| Elasmer-1000ES | | |
| Porea SL-100A | | |
| MOCA | 42.9 | 42.9 |
| CuA-4 | | |
| Ethacure-300 | | |
| DABCO-33LV | 0.8 | 0.3 |
| DABCO K-15 | 0.4 | |
| TOYOCAT-ET | | 0.1 |
| SZ-1932 | 1.2 | 1.5 |
| Water | | 0.3 |
| 141b | 18.5 | 35 |
| 143L | 75.4 | 82.6 |
| PAPI-135 | | |
| GC-400 | 133 | 133 |

TABLE 6

| Items | Examples | | | |
|---|---|---|---|---|
| | Example 15 | Example 16 | Comparative example 2 | Comparative example 3 |
| [Physical properties] | | | | |
| Density [g/cm³] | 0.18 | 0.09 | 0.08 | 1.45 |
| Hardness [Asker C] | 71 | 42 | 43 | 99 |
| de Mattia test | | | | |
| [cycles] | 20000 or more | 20000 or more | 0 | 0 |
| [Grinding property] | | | | |
| Evaluated rank | 4 or more | 4 or more | 3 or more | 3 or more |
| Luster | Yes | Yes | None | Poor |
| Disintegration | | | | |
| Flat portion | None | None | Yes | None |
| Edge portion | None | None | Yes·※· | None |
| Practicality | Yes | Yes | None | None·※·※· |

※·The grinder material was disintegrated for a few seconds and disappeared.
※·※·Its evaluation rank of grinding property was low so that it was devoid of precision grinding property to thereby recording as no-practicality.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A polyurea elastic foamed grinder material for grinding and/or buffing, prepared by subjecting a composition comprising:
   a main ingredient component (A) including a polyisocyanate (A-1), and a component (B) including an aromatic diamine (B-1), a foaming agent (B-2), a foam stabilizing surfactant (B-3), and a curing catalyst (B-4), to foaming and curing in the presence of grinder granules (C),
   wherein said aromatic diamine (B-1) is an aromatic diamine oligomer (B-1-1) alone or a mixture of the aromatic diamine oligomer (B-1-1) and an aromatic diamine compound (B-1-2);
   wherein said aromatic diamine oligomer (B-1-1) is an aromatic diamine oligomer represented by formula (1):

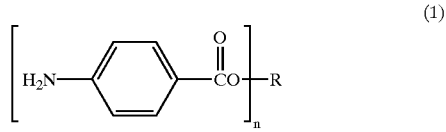

(1)

wherein R represents a group to give an n-valent polyalkylene polyol, polyalkylene ether polyol or polyalkylene ester polyol each having an average molecular weight of 200 or more; and n represents 2 or 3; and an unsaturated bond or bonds may be contained in the polyalkylene moiety;
   wherein said aromatic diamine compound (B-1-2) is at least one aromatic diamine compound selected from the group consisting of 4,4'-methylene-bis(2-chloroaniline), 4,4'-methylene-bis(2,3-dichloroaniline), 4,4'-methylene-bis(2,5-dichloroaniline), 4,4'-methylene-bis(3-chloro-2,5-diethylaniline), trimethyleneglycol-bis(4-aminobenzoate), 4-chloro-3,5-diamino-benzoic acid isobutyl ester, 3,5-dimethylthio-2,4-toluenediamine, 3,5-dimethylthio-2,6-toluenediamine, 4,4'-methylene-bis-(methylanthranilate) and 1,2-bis(2-aminophenylthio)ethane;
   wherein a ratio of the content of said aromatic diamine compound (B-1-2) in the aromatic diamine (B-1) is 50% by mass or less;
   wherein said main ingredient component (A) and said component (B) are contained in amounts in terms of a molar ratio of isocyanate groups in the isocyanate (A-1) as the main ingredient component (A) to amino groups in the aromatic diamine (B-1) in the component (B) ($NCO/NH_2$), is within 0.8 to 1.5;
   wherein the foaming agent (B-2) is in an amount more than 0% by mass to 30% by mass or less in the component (B);
   wherein the foam stabilizing surfactant (B-3) is in an amount more than 0% by mass to 6% by mass or less in the component (B);
   wherein the curing catalyst (B-4) is in an amount more than 0% by mass to 5% by mass or less in the component (B); and
   wherein an amount of said grinder granules (C) is 20 to 70% by mass of a total amount of the main ingredient component (A), the grinder granules (C) and the component (B) with the exception of the foaming agent (B-2).

2. The grinder material according to claim 1, wherein said n in formula (1) represents 2.

3. The grinder material according to claim 1, wherein said aromatic diamine compound (B-1-2) is 4,4'-methylene-bis(2-chloroaniline).

4. The grinder material according to claim 1, wherein a ratio of the content of said aromatic diamine compound (B-1-2) in the aromatic diamine (B-1) is 5–50% by mass.

5. The grinder material according to claim 1, wherein a foaming magnification of a polyurea elastomer caused by the foaming agent is 1.2 to 35 times, and a density of the grinder material is within the range from 0.03 to 1.2.

6. The grinder material according to claim 1, wherein said grinder granules (C) are fine particles.

7. The grinder material according to claim 1, which is used for precision grinding and/or buffing.

8. A method for producing a polyurea elastic foamed grinder material for precision grinding and/or buffing according to claim 1, which comprises:

mixing the aromatic diamine (B-1), the foaming agent (B-2), the foam stabilizing surfactant (B-3) and the curing catalyst (B-4), further adding the grinder granules (C) to the resultant mixture, followed by mixing and dispersing to prepare a curing component, mixing the curing component with the main ingredient component (A) comprising the polyisocyanate (A-1) at room temperature, and subjecting the resulting mixture to heating for reaction and wherein an amount of said grinder granules (C) is 20 to 70% by mass of a total amount of the main ingredient component (A), the grinder granules (C) and the component (B) with the exception of the foaming agent (B-2).

9. The elastic foamed grinder material according to claim 1, wherein the grinder granules (C) have a size of 1.2 to 57 $\mu$m.

10. The elastic foamed grinder material according to claim 1, wherein a foaming magnification of a polyurea elastomer caused by the foaming agent (B-2) is 5 to 30 times, and a density of the grinder material is within the range from 0.05 to 1.10.

11. A method of grinding one or more members selected from the group consisting of metals, stainless steels, titanium alloys, glassware, minerals, stones, ceramics, and plastics comprising grinding said metals, stainless steels, titanium alloys, glassware, minerals, stones, ceramics, or plastics wherein said one or more members are grinded with the grinder material as disclosed in claim 1.

12. The method according to claim 11, wherein grinding is conducted by precision grinding and/or buffing.

* * * * *

UNITED STATES PATENT AND TRADEMARK OFFICE
CERTIFICATE OF CORRECTION

| | |
|---|---|
| PATENT NO. | : 6,949,589 B2 |
| APPLICATION NO. | : 10/096245 |
| DATED | : September 27, 2005 |
| INVENTOR(S) | : Yoshijiro Oyaizu |

It is certified that error appears in the above-identified patent and that said Letters Patent is hereby corrected as shown below:

<u>In the Drawing</u>:

Delete the drawing printed in the patent as "Fig. 1" and substitute therefore the single sheet of drawing attached hereto, labeled --Fig. 1--, which was filed in the application on March 13, 2002.

<u>Column 6, line 27</u>:

The work "P-1100" should read as -- P-1000 --.

<u>Column 12, line 66</u>:

Please delete "5".

<u>Column 16, line 54</u>:

In Table 1, the number "54" should read as -- 54.0 --.

<u>Column 17, about line 58</u>:

In Table 4, in the row labeled MOCA, the number "429" should read as -- 42.9 --.

UNITED STATES PATENT AND TRADEMARK OFFICE
CERTIFICATE OF CORRECTION

PATENT NO. : 6,949,589 B2
APPLICATION NO. : 10/096245
DATED : September 27, 2005
INVENTOR(S) : Yoshijiro Oyaizu It is certified that error appears in the above-identified patent and that said Letters Patent is hereby corrected as shown below:

Column 18, about line 32:

In "Table 4 –continued," in the 3rd row, the label "NCO index indes" should read as -- NCO index (index) --.

Signed and Sealed this

Seventeenth Day of October, 2006

JON W. DUDAS
*Director of the United States Patent and Trademark Office*

Magnification : 100×
No.3    #3000    50%
Average particle diameter    6±0.5 μm

UNITED STATES PATENT AND TRADEMARK OFFICE
CERTIFICATE OF CORRECTION

PATENT NO. : 6,949,589 B2 Page 1 of 1
APPLICATION NO. : 10/096245
DATED : September 27, 2005
INVENTOR(S) : Yoshijiro Oyaizu It is certified that error appears in the above-identified patent and that said Letters Patent is hereby corrected as shown below:

Column 6, line 27:

The word "P-11000" should read -- P-1000 --.

Signed and Sealed this

Twenty-third Day of January, 2007

JON W. DUDAS
*Director of the United States Patent and Trademark Office*